United States Patent
Shaff et al.

(10) Patent No.: US 6,688,033 B2
(45) Date of Patent: Feb. 10, 2004

(54) ICE FISHING DEVICE

(75) Inventors: Gerald H. Shaff, Branford, CT (US); Richard V. Hansen, Evansmills, NY (US)

(73) Assignee: Gerole Enterprises, Inc., Branford, CT (US)

( * ) Notice: Subject to any disclaimer, the term of this patent is extended or adjusted under 35 U.S.C. 154(b) by 0 days.

(21) Appl. No.: 10/186,980

(22) Filed: Jul. 2, 2002

(65) Prior Publication Data

US 2004/0003532 A1 Jan. 8, 2004

(51) Int. Cl.[7] ............................................... A01K 97/12
(52) U.S. Cl. .......................................................... 43/17
(58) Field of Search ................................ 43/17, 15, 16

(56) References Cited

U.S. PATENT DOCUMENTS

| | | | |
|---|---|---|---|
| 2,448,346 A | | 8/1948 | Baugh et al. |
| 2,565,379 A | | 8/1951 | Laurila |
| 2,651,875 A | | 9/1953 | Brockman |
| 2,654,176 A | * | 10/1953 | Kachelski et al. ............. 43/17 |
| 2,837,857 A | * | 6/1958 | Ellison ........................... 43/17 |
| 2,908,100 A | | 10/1959 | Mogren |
| 2,977,704 A | | 4/1961 | Tinsley |
| 3,196,570 A | | 7/1965 | Borisch |
| 4,021,958 A | * | 5/1977 | Snodie ............................ 43/17 |
| 4,707,932 A | * | 11/1987 | Sonnemaker ................... 43/17 |
| 5,107,613 A | | 4/1992 | Hemmingsen |

* cited by examiner

Primary Examiner—Charles T. Jordan
Assistant Examiner—Kimberly S. Smith
(74) Attorney, Agent, or Firm—Cantor Colburn LLP

(57) ABSTRACT

An ice fishing device comprising a column member adapted to be supported in an upright position in an ice hole in an operative position, support means are pivotally mounted to the column member, adapted to span an ice hole and support the column member in an upright position. A reel is rotatably mounted to the column member and positioned thereon to be underwater when the column member is in an operative position. A flexible signal mast is attached to the column member at the upper end thereof, and is bendable essentially one hundred eighty degrees to an armed position and will spring upright when released from the armed position. A first bearing bracket is mounted to the column member at a lower position when said column member is in an operative position and a second bearing bracket is mounted to the column member at an upper position above water when said column member is in an operative position. The bearing brackets receive a sleeve there between and sealing means are provided in the bearing brackets at the ends of the sleeve. An actuator rod extends through the sealing means and is rotatable therein. The actuator rod has a crank at the end thereof adjacent the reel. An offset cam on the reel is adapted to engage the crank and rotate the actuator rod. The actuator rod has a signal mast engaging means at the upper end thereof engaging the free end of the signal mast and holding the signal mast in an, armed position. When rotated by pay-out of line from the reel the actuator rod will release the signal mast and permit it to spring back to a vertical position.

10 Claims, 2 Drawing Sheets

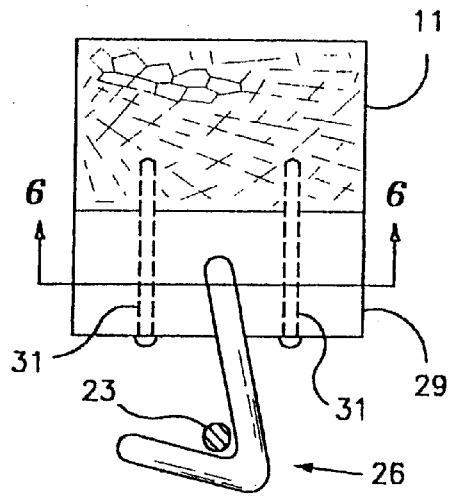
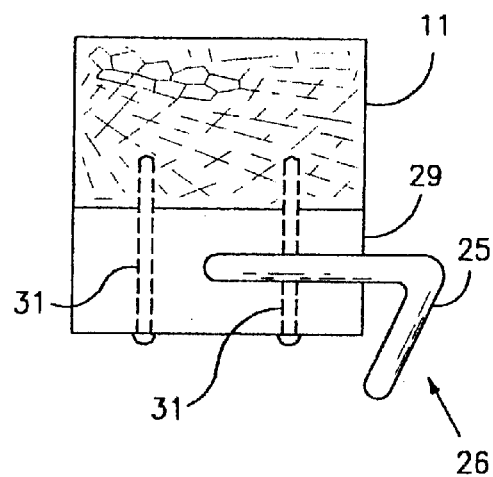
FIG. 4    FIG. 5
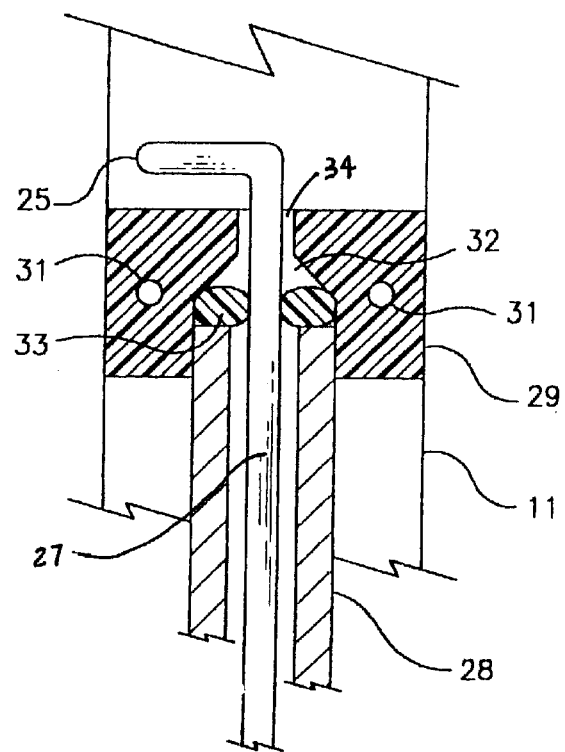
FIG. 6

ICE FISHING DEVICE

FIELD OF THE INVENTION

This invention relates to an ice fishing device and more particularly a normally unattended device which provides a visual signal when a fish takes the hook and pulls off line.

BACKGROUND OF THE INVENTION

Ice fishing is a very popular winter activity in many areas where lakes or ponds freeze over in the winter to a depth sufficient to support humans. It is customary for the ice fisherman to cut a hole in the ice and insert tackle in the water in one or more places and then attempt to keep warm. The various gear used by ice fishermen usually includes a visual signaling device which is activated when a fish hits and starts to pull out line. These devices are commonly known as tip-ups.

These devices, when operatively positioned, generally comprise an upright column member having an essentially perpendicular support member which bridges the hole in the ice. A reel is positioned on the column member and immersed in the water. A flexible signaling mast is carried at or adjacent the top of the column member and bent over and held by a retainer in a retracted position until line is pulled from the reel. An actuator member is rotatably carried on or in the column member. The actuator member is rotated by a cam on the reel and upon rotation will release the flexible member from its retainer. Usually a flag is positioned on the end of the flexible member for increased visibility. The actuator member is enclosed in a sleeve between the reel and the retainer. Problems occur when water freezes in this sleeve and the actuator cannot rotate. The generally accepted technique of preventing freeze up of the actuator rod in the sleeve is to provide a low temperature lubricant in the sleeve.

The present invention provides a new and improved sealing and bearing arrangement for the actuator rod which prevents freeze up and does not require a lubricant. The present invention further provides a tip-up of simplified construction where the actuator rod is also the retainer for the flexible signaling mast An object of this invention is to provide a new and improved tip-up of the type described.

Another object of this invention is to provide a new and improved tip-up of the type described which has a minimal number of parts and is economical in construction.

A further object of this invention is to provide a tip-up of new and improved construction which eliminates the problem of ice impeding the operation of the actuator member and eliminates the need for a signal mast retainer on the column.

SUMMARY OF THE INVENTION

Briefly stated, an ice fishing device embodying the invention, in one form thereof comprises a column member adapted to be supported in an upright position in an ice hole in an operative position, support means are pivotally mounted to the column member adapted to span an ice hole and support the column member in an upright position. A reel is rotatably mounted to the column member and positioned thereon to be underwater when the column member is in an operative position. A flexible signal mast is attached to the column member at the upper end thereof, and is bendable essentially one hundred eighty degrees to an armed position and will spring upright when released from the armed position. A first bearing bracket is mounted to the column member at a lower position below water when the column member is in an operative position and a second bearing bracket is mounted to the column member at an upper position above water when said column member is in an operative position. The bearing brackets receive a sleeve there between and sealing means are provided in the bearing brackets at the ends of said sleeve. An actuator rod extends through the sleeve and sealing means and is rotatable therein. The actuator rod has a crank at the end thereof adjacent the reel. An offset cam on the reel is adapted to engage the crank and rotate the actuator rod. The actuator rod has a signal mast engaging means at the upper end thereof engaging the free end of the signal mast and holding the signal mast in an armed position. When rotated by pay-out of line from the reel the actuator rod will release the signal mast and permit it spring back to a vertical position.

The invention is particularly pointed out and distinctly claimed in the concluding portion of this specification. The invention, however, together with further objects and advantages thereof, may be best appreciated by reference to the following detailed description taken in conjunction with the drawings

BRIEF DESCRIPTION OF THE DRAWINGS

FIG. 4 is a view, partially in section and partially cut-away, seen in the plane of lines 4—4 of FIG. 1 when the actuator holds the signal mast in an armed condition;

FIG. 5 is a view also seen in the plane of lines 4—4 of FIG. 1 when the actuator has rotated to release the signal mast; and FIG. 6 is a view seen in the plane of lines 6—6 of FIG. 4 showing the actuator member in the same position as in FIG. 1.

DETAILED DESCRIPTION OF PREFERRED EMBODIMENT OF THE INVENTION

Figure 1:
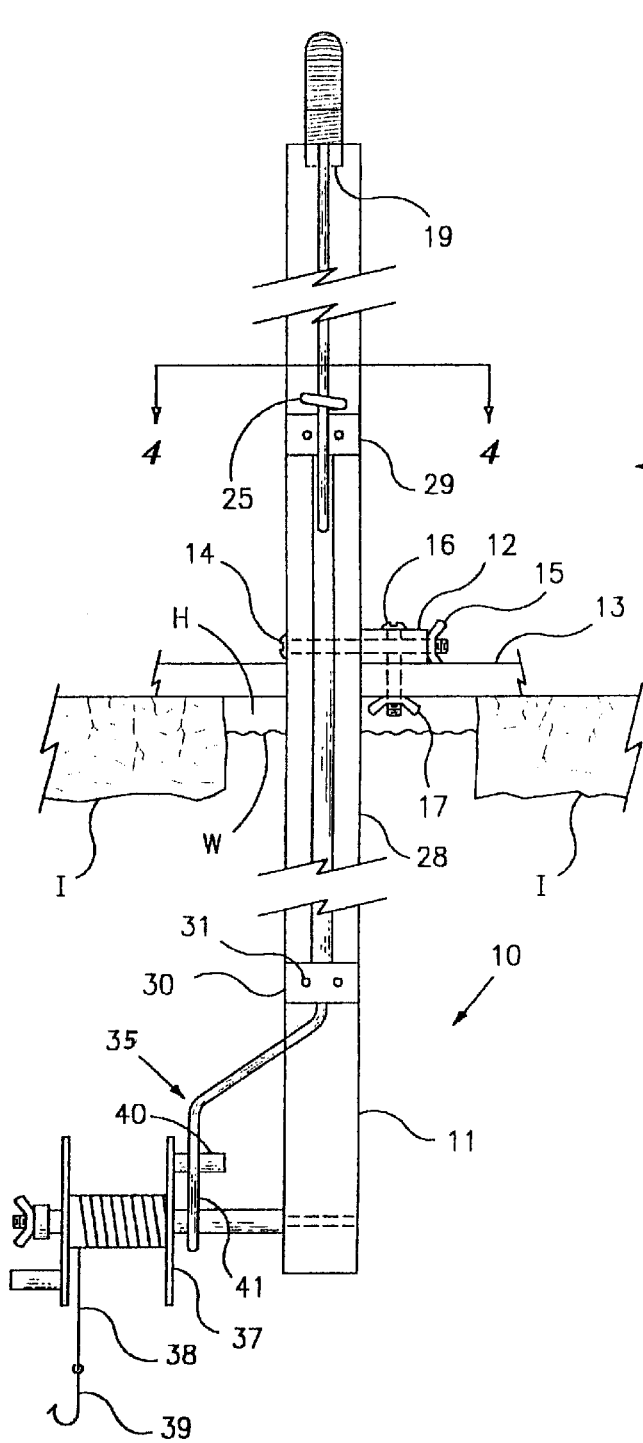
FIG. 1 is an elevation of a tip-up embodying the invention shown positioned in a hole in the ice and supported by cross members with the reel below the surface of the water and the signal mast held in an armed condition by an actuator member.
Figure 2:
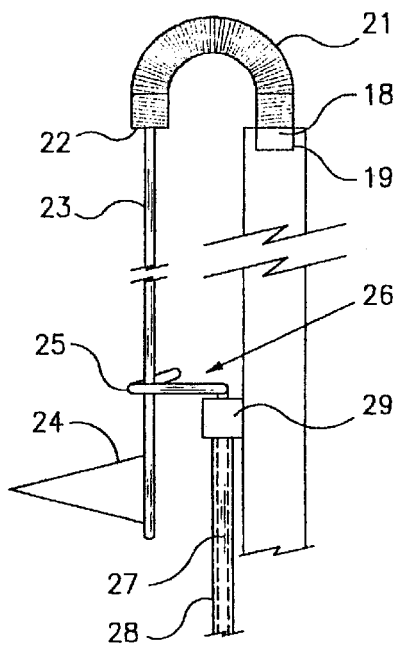
FIG. 2 is a partial side elevation of the tip-up of FIG. 1 seen from the right side thereof; and showing the signal mast in an armed condition.
Figure 3:
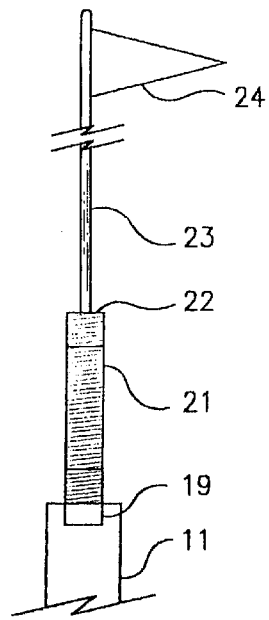
FIG. 3 is a partial side elevation of the tip-up of FIG. 1 showing the signal mast extended.

Reference is first made to FIGS. 1–3. An ice fishing device or tip-up 10 embodying the invention in an operative mode comprises an upright column member 11, shown as supported on ice surrounding a fishing hole by cross support members 12 and 13. Support member 12 is pivotally connected to column 11 by a bolt 14 retained by a wing nut 15. Support member 13 is pivotally mounted to support member 12 by a bolt 16 retained by a wing nut 17. Support members 12 and 13 may be positioned perpendicular to column 11 and perpendicular to each other as shown. When the device 10 is not in use the support member 12 and 13 may be pivoted to be parallel to column 11 for transportation and storage. Support members 12 and 13 span a hole H in ice I. Column 11 extends below water level W as shown and hereinafter discussed.

A plug 18 is fitted into a counter bored socket 19 in the top of column 11 and receives a helical spring 21 tightly fitted thereon. The other end of helical spring 21 tightly receives another plug 22 carrying a rod 23 thereon. Together the spring 21 and rod 23 comprise the signaling mast. The signaling mast is shown in an armed position retained by the upper end 25 of an actuator member and shown in a signaling position when released by actuator member 26 in FIG. 3. A linear rod portion 27 of actuator member 26 is within a sleeve 28 as hereinafter described.

Secured to column 11 are spaced apart bearing blocks 29 and 30. The bearing blocks 29 and 30 are fastened to column by nails or screws 31. Only one bracket need be explained in detail since each is an inversion of the other. Actuator member 26 is rotatably supported in bearing means in brackets 29 and 30 as will hereinafter be described.

Reference is now made to FIGS. 4 and 5 which are views seen in the plane of line 4—4 of FIG. 1. As shown in FIG. 4 the upper end 25 of actuator member 26 is shaped like a hook to capture the signaling mast and hold it in an armed condition. Actuator member 26 will rotate to the position shown in FIG. 5 when a fish hits the line and begins to run. The hooked end 25 of actuator member will release the signaling mast which springs upright as shown in FIG. 2 when actuator member is rotated toward the position shown in FIG. 5.

Reference is now made to FIG. 6 taken in conjunction with FIG. 1. Bearing block 29 is bored to provide a recess 32 and receives a reselient O-ring seal 33 therein. The bearing blocks 29 and 30 are positioned on column 11 a distance apart such that the ends of cylindrical sleeve 28 compress the O-ring seals in each of bearing blocks 29 and 30 against the walls defining the recess 32. This results in the O-ring seals 33 expanding radially or attempting to expand radially in both directions. The O-ring seals will compressively engage rod portion 27 of actuator member 26 and provide upper and lower seals thereabout. The O-rings further provide bearings to center rod 27 in sleeve 28 and facilitate rotation of rod portion 27.

While recess 32 has been shown as fustro-conical the shape will depend on the boring tool used to define the recess 31. Recess 31 may be flat bottomed. In either case a smaller passage 34 in the bearing blocks is provided in communication with recess 32 for passage of rod portion 27 of actuator member 26.

Actuator member 26 is a rod with the upper end 25 formed as a hook and the lower end formed into a crank. In between the ends actuator member is rod portion 27 The expanded O-ring seals tightly engage rod portion 27 of actuator member 26 and provide bearings for rotation of rod portion 27 of actuator member 26. This sealing and bearing arrangement prevents any water from entering sleeve 28 and thus eliminates the problem of ice forming between the actuator member and its housing or sleeve which would prevent actuator member 27 from rotation.

Rotatably mounted to column 11 at the lower end thereof is a reel 37 having line 38 with a fishing hook 39 thereon. A cam 40 extends from reel 37. Cam 40 is arranged to engage arm 41 of crank 35 when reel 37 is rotated by pay out of line 38 from reel 37. As line 38 is pulled out, reel 37 rotates clockwise (as viewed from the left of FIG. 1). Cam 40 engages arm 41 of crank 35 and rotates the actuator member 26 such that the upper end 25 thereof moves from the position shown in FIG. 4 toward the position shown in FIG. 5. This will release signaling mast to spring to an upright position as shown in FIG. 3.

From the foregoing description it may be seen that a new and improved tip-up of simplified construction is provided.

The bearing and sealing arrangement for the actuator rod eliminates the requirement for a low temperature lubricant in a sleeve or other passage for an actuator rod while eliminating the problem of possible freeze-up of the actuator rod within its sleeve or passage. Moreover, the tip-up is further simplified by having the signaling mast directly captured by the actuating member and hold it in an armed condition.

It may thus be seen that the objects of the invention set forth above as well as those made apparent are efficiently attained. While preferred embodiments of the invention have been set forth and described for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. An ice fishing device comprising:
   a column member adapted to be supported in an upright position in an ice hole in an operative position;
   support means pivotally mounted to said column member adapted to span an ice hole and support said column member in an upright position;
   a reel rotatably mounted to said column member and positioned thereon to be underwater when said column member is in an operative position;
   a flexible signal mast attached to said column member at an upper end thereof, said signal mast being bendable essentially one hundred eighty degrees to an armed position and spring upright when released from said armed position;
   a first bearing block mounted to said column member at a lower position when said column member is in an operative position and a second bearing block mounted to said column member at an upper position above water when said column member is in an operative position, said bearing blocks receiving a sleeve there between;
   sealing means in said bearing blocks at the ends of said sleeve, an actuator rod extending through said sealing means and rotatable therein, said actuator rod having a crank at the end thereof adjacent said reel, and offset cam on said reel adapted to engage said crank and rotate said actuator rod, said actuator having signal mast engaging means at the upper end thereof engaging a free end of said signal mast and holding said signal mast in an armed position.

2. The device of claim 1 wherein said signaling mast comprises a helical spring attached to the top of said column at one end thereof and carrying a rod at the other end thereof which is releaseably captured by said actuator member at the other end thereof.

3. The device of claim 1 wherein the upper end of said actuator member is formed as a hook to capture said signaling mast.

4. An ice fishing device comprising:
   a column member adapted to be supported in an upright position in an ice hole in an operative position;
   support means pivotally mounted to said column member adapted to span an ice hole and support said column member in an upright position;
   a reel rotatably mounted to said column member and positioned thereon to be underwater when said column member is in an operative position;

a flexible signal mast attached to said column member at an upper end thereof, said signal mast being bendable essentially one hundred eighty degrees to an armed position and spring upright when released from said armed position;

a first bearing block mounted to said column member at a lower position when said column member is in an operative position and a second bearing block mounted to said column member at an upper position above water when said column member is in an operative position, said bearing blocks arranged to receive a sleeve there between;

resilient sealing means in said bearing blocks at ends of said sleeve and held in compression by the ends of said sleeves, an actuator rod extending through said bearing blocks and engaging said sealing means, said actuator rod having a crank at the end thereof adjacent said reel, and offset cam on said reel adapted to engage said crank and rotate said actuator rod, said actuator member being arranged to release said signaling mast from an armed condition upon rotation thereof.

5. The device of claim 4 wherein said bearing blocks are counter bored to receive said sleeve and define a surface therein, said sealing means comprising resilient O-rings which are compressed by the ends of said sleeve against said surfaces and form a seal with said actuator rod.

6. The device of claim 4 wherein said signaling mast comprises a helical spring attached to said upper end of said column and a flag end that is releaseably captured by said actuator rod.

7. The device of claim 4 wherein the upper end of said actuator member is formed as a hook to capture said signaling mast.

8. An ice fishing device comprising:

a column member having a first end and a second end;

a reel rotatably mounted to said first end of said column member;

a flexible signal mast attached to said second end of said column member, said signal mast being bendable to an armed position;

a first bearing block mounted to said column member and a second bearing block mounted to said column member, said first bearing block and said second bearing block arranged to receive a sleeve;

an actuator rod is disposed within said sleeve, said actuator rod extends through said first bearing block and said second bearing block, said actuator rod has a crank disposed adjacent to said reel, said actuator rod includes means for releasably retaining said flexible signal; and means for sealing said sleeve in said first bearing block and means for sealing said sleeve in said second bearing block, said actuator rod is rotatable within said first bearing block and said second bearing block.

9. The device of claim 8, wherein said bearing blocks are counter bored to receive said sleeve and define a surface therein, said means for sealing comprising resilient O-rings which are compressed by the ends of said sleeve against said surface and form a seal with said actuator rod.

10. The device of claim 8, wherein said means for releasably retaining said flexible signal is an end of said actuator rod formed as a hook to capture said signaling mast.

\* \* \* \* \*